United States Patent [19]

Miles et al.

[11] Patent Number: 4,485,467

[45] Date of Patent: Nov. 27, 1984

[54] DIGITAL INFORMATION SWITCH MATRIX WITH ON-LINE/OFF-LINE DIAGNOSTIC FEATURES

[75] Inventors: Larry L. Miles, Garland; John D. Meyers, Plano, both of Tex.

[73] Assignee: Teknekron Infoswitch Corporation, Richardson, Tex.

[21] Appl. No.: 350,096

[22] Filed: Feb. 18, 1982

[51] Int. Cl.³ .............................................. H04J 3/14
[52] U.S. Cl. ........................................ 370/14; 370/66
[58] Field of Search ...................... 370/14, 13, 16, 66, 370/68

[56] References Cited

U.S. PATENT DOCUMENTS

| | | | |
|---|---|---|---|
| 3,920,914 | 11/1975 | Regnier et al. | 370/16 |
| 3,921,141 | 11/1975 | Wilber | 340/172.5 |
| 3,958,111 | 5/1976 | Hackett | 235/153 AK |
| 4,031,375 | 6/1977 | Jaskulke | 235/153 AK |
| 4,064,369 | 12/1977 | Battocletti | 179/15 BF |
| 4,149,038 | 4/1979 | Pitroda et al. | 370/14 |
| 4,195,206 | 3/1980 | Baichtal | 370/14 |
| 4,197,523 | 4/1980 | Phillip | 371/49 |
| 4,296,492 | 10/1981 | Hafer | 370/14 |
| 4,302,836 | 11/1981 | Bouvier d'Ivoire et al. | 370/14 |
| 4,402,074 | 8/1983 | Cupuis et al. | 370/14 |

Primary Examiner—Douglas W. Olms
Attorney, Agent, or Firm—Andrew S. Viger

[57] ABSTRACT

A time slot interchange switch matrix incorporates processor-controlled diagnostic functions to provide programmable on-line/off-line diagnostic monitoring. The switch matrix output can be tri-stated during program-selected time slots while remaining electrically connected to the PCM buses, allowing redundant switch matrices to share on-line time slot interchange switching in any programmable manner. Inject and monitor circuitry enables the switching function of the on-line switch matrix to be tested time slot by time slot under program control using unused time slots. Parity checking, including verification of check circuitry, is provided for input PCM data, control memory addressing output, and data memory output through the tri-state output drivers. In addition to on-line inject and monitor testing, the off-line switch matrix selectively monitors the output of the on-line matrix to confirm that it is driving the PCM buses. If a malfunction is detected, the faulty switch matrix may be electrically disconnected from PCM buses by remote command.

8 Claims, 8 Drawing Figures

TIME SLOT INTERCHANGE DATA FLOW

FIG. 5

RSU MATRIX PWA
SIMPLIFIED BLOCK DIAGRAM

DIGITAL INFORMATION SWITCH MATRIX WITH ON-LINE/OFF-LINE DIAGNOSTIC FEATURES

BACKGROUND OF THE INVENTION

The present invention is directed to time division multiplex digital information switching systems, and more particularly, to a digital information (voice/data) time slot interchange switch matrix incorporating processor-controlled diagnostic functions that enable on-line/off-line programmable monitoring of redundant switch matrices to identify errors in input and output information, diagnostic and control instructions, and the time slot interchange switching function.

The telecommunications field is currently undergoing rapid technological changes primarily through adapting microprocessor-based data processing technology throughout common carrier and private telecommunication networks. In particular, new central office and private branch exchange switching systems increasingly use digital switching techniques capable of handling both digitized voice and data communications.

At the same time, new data communication systems involving the exchange of all types of data and information in digital form have been developed. Word processing and electronic message systems based upon dispersed microprocessor technology have been developed to supplement traditional data processing, and to provide a more complete scope of services for both standard business offices and large corporations. The tendency has been to design these data-word processing systems independently of communications systems, i.e., word processing systems, data processing systems and telephone exchanges that are self-contained and designed specifically for those respective functions. However, the benefits of integrating communications and data-word processing functions are becoming generally recognized as a means to efficiently manage the generation, transfer, use and storage of business information. Such integrated information communications requires a communication hub or switching system into which the information can flow, be it data, text, voice or messages and be switched to its destination.

One such communication hub is the subject of a patent application entitled DIGITAL INFORMATION SWITCHING SYSTEM, Ser. No. 248,821 (filed Mar. 30, 1981) now U.S. Pat. No. 4,442,502, which is assigned to the assignee of the present invention, Datapoint Corporation, and marketed under the trademark ISX. That digital information switching system combines the features of an information processing system and a telephone private branch exchange in an overall digital system having dispersed processing, flexibility in size and automatic maintenance features. The system provides for dispersed switching architecture featuring modular design with dispersed microprocessor control. Information is switched locally in one of a plurality of remote switching units either for connection between local terminals, or in the case of information to be exchanged between terminals connected to different remote switching units, for transmission to a central switching unit which is connected to each remote switching unit by interswitch links.

For an information communications hub such as the digital information switching system described above, minimizing the risk of system failure is of prime importance. The digital information switching system includes a maintenance/diagnostic processor, running a dedicated diagnostic program, to manage self-diagnostic maintenance procedures that continually monitor each central and remote switching unit. If a problem occurs, the faulty component or circuit board is isolated, electrically disconnected and its spare is automatically brought on-line without outside control. A diagnostic report is then automatically forwarded to a central service center precisely identifying the faulty component. The self-diagnostic maintenance functions incorporated in the digital information switching system are implemented without interruption to calls in progress, even if a malfunction occurs in a critical area, such as one of the system microprocessors, memories or switch matrix.

Regarding the switch matrix, incorporating self-diagnostic functions capable of detecting malfunctions in the following areas would be advantageous to maximize reliability: (a) input PCM data from the various ports, (b) address and control data used in effecting time slot interchange switching, (c) the time slot interchange function, (d) output PCM data after time slot interchange switching, and (e) monitor instructions to the switch matrix received in the course of implementing these diagnostic functions. Moreover, performing these diagnostic functions continuously in a programmable manner on each of redundant on-line/off-line switch matrices, and while each is electrically connected and ready to perform the switching function, also would be advantageous.

SUMMARY AND OBJECTS OF THE INVENTION

Objects

A principal object of the present invention is to provide a digital information switch matrix incorporating diagnostic functions that permit automatic on-line/off-line monitoring of the switching functions of redundant switch matrices. To that end, specific objects of the present invention include providing a digital information switch matrix that:

(a) Incorporates fully programmable inject and monitor testing of the time slot interchange switching function for redundant switch matrices;

(b) Provides the capability for an off-line switch matrix to monitor the output of an on-line switch matrix;

(c) Provides complete parity checking for input and output (after switching) PCM data, address and control data used in effecting time slot interchange switching and diagnostic instructions from a central diagnostic/maintenance processor, including check circuitry verification; and (d) Provides remote connect/disconnect under the control of the diagnostic/maintenance processor.

Summary

Briefly, these and other objects that will be apparent to those of ordinary skill in the art are accomplished by the digital information switch matrix of the present invention which, in conjunction with an external diagnostic/maintenance processor, performs fully programmable, inject and monitor testing of the time slot interchange switching function for redundant switch matrices. In selectable time slots, an inject multiplexer substitutes for corresponding input PCM data programmable inject data provided by the diagnostic/maintenance processor (along with the inject time slot number and an inject select signal). The inject multiplexer output is applied to a switching memory that performs time slot interchange switching, with the diagnostic/maintenance processor providing the switching memory addresses for the time slots containing inject data. The resulting interchanged PCM/inject data is applied to an output driver responsive each time slot to a programmable out-enable signal (designated by the diagnostic/maintenance processor) to transmit interchanged PCM/inject data from either of the redundant switch matrices.

For those time slots in which inject data is substituted, the diagnostic/maintenance processor controls in any programmable manner the time slot interchange function, permitting all possible time slot interchange combinations to be tested. Because the output driver transmits interchanged PCM/inject data only when enabled by the out-enable signal, redundant switch matrices may be continuously tested, in any programmable manner, with only one switch matrix actually transmitting interchanged PCM data during a given time slot.

The switching memory includes data and control memories, with PCM data (or inject data) from the inject multiplexer being written into the data memory in sequential time slots, and being read out in the desired interchanged time slot sequence according to an interchange address from the control memory. The control memory also provides the programmable out-enable signal designated by the diagnostic/maintenance processor.

In addition to inject and monitor testing, the switch matrix employs extensive parity checking to monitor the accuracy of input PCM data, output interchanged PCM/inject data and address/control data from the control memory. In addition, parity checking is provided for all diagnostic instructions from the diagnostic/maintenance processor. Even/odd parity checking modes are used to provide check circuitry verification. Parity error indications are provided to the diagnostic/maintenance processor.

If the above diagnostic procedures detect a malfunction in the switch matrix, it can be automatically disconnected through connect/disconnect logic responsive to a connect/disconnect command from the diagnostic/maintenance processor.

BRIEF DESCRIPTION OF THE DRAWINGS

A more complete understanding of the present invention can be had by reference to the following detailed description of a preferred embodiment when considered in conjunction with the accompanying drawings in which.

DESCRIPTION OF A PREFERRED EMBODIMENT

The following detailed description of the Digital Information Switch Matrix ("Matrix") of the present invention is with respect to its application in the digital information switching system ("switching system") described in patent application Ser. No. 248,821 referenced in the Background, which is incorporated by reference. The Matrix provides time slot interchange ("TSI") switching of a time slot multiplexed, plus code modulated voice and/or data stream ("PCM data") for internal and external (e.g. public or private carrier) interconnection of the terminals served by the digital information switching system. PCM data inputs to and outputs from the Matrix are bit-parallel/byte-serial, eight data bits plus parity. The Matrix can function in any digital switching system that provides the processing capability to support the diagnostic functions incorporated in the Matrix (digital switching systems using serial PCM data buses would have to provide serial/parallel conversion).

I. SWITCHING SYSTEM INCLUDING MATRIX

The switching system architecture includes a central switching unit ("CSU") and a plurality of remote switching units ("RSU"). The CSU performs central switching control, call processing and external communication functions, with local switching and telephone terminal interface being accomplished by the RSUs. Information destined for an area outside that of a RSU, such as another RSU, a remote data base or terminal, or public or private carrier, is routed from the RSU through the CSU over interswitch communication links.

Figure 1:
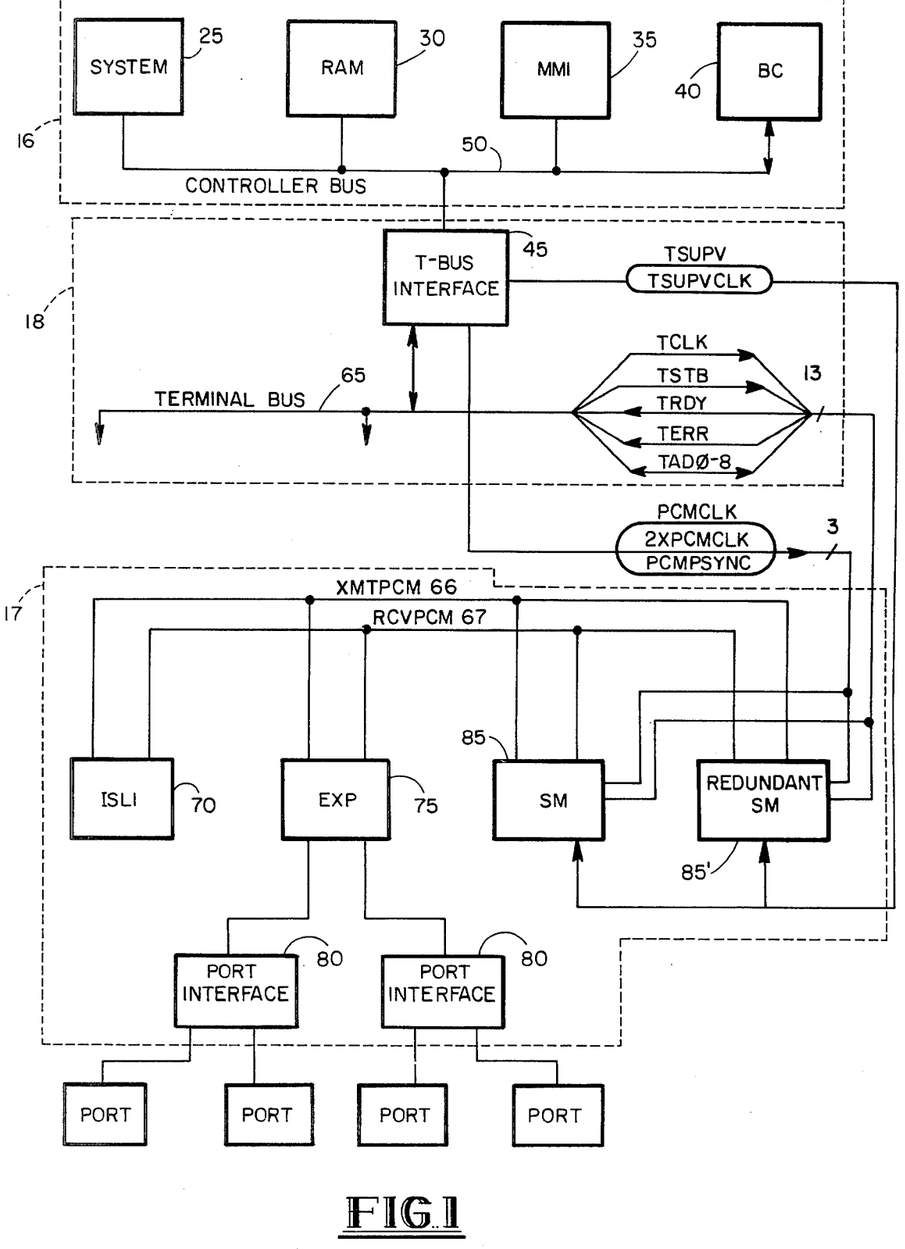
FIG. 1 is a schematic diagram of a remote switching unit configuration of a digital information switching system, showing redundant switch matrices, system and diagnostic/MMI processors and the interfacing terminal bus network.

For both RSU and CSU configurations, the switching function is provided by the Matrix, with self-diagnostic functions being implemented in conjunction with diagnostic/maintenance processing capability provided by the RSU/CSU. For example, FIG. 1 shows a RSU comprising a controller network 16 (including a diagnostic/maintenance processor), a communications network (including a Matrix) 17, and an interface network 18 for exchanging processing and diagnostic/maintenance data between the controller and communications networks. (The functioning of the Matrix in both RSU and CSU configurations is identical.)

A. Communications Network Including the Matrix

Communications network 17 includes an interswitch link (ISL) interface 70, an expander 75 with its associated port interfaces 80, and the Matrix which is designated 85. Time slot multiplex PCM data is transmitted between these components over a XMTPCM bus 66 and a RCVPCM bus 67.

ISL interface 70 serves up to two full duplex interswitch links, which provide communication links between the RSU and a CSU and which may be provided by coaxial cable, digital microwave radio, optical data link, or standard T1 PCM span link. In addition to time slots for PCM data, each ISL transmits a synchronizing time slot and a time slot for exchanging data between the processors of the RSU and CSU.

Expander 75 provides the interface to the PCM buses for port interfaces 80, each of which serves up to 8 ports or devices (such as rotary or push button telephones, electronic telephone sets, digital data terminals, facsimile machines, interfaces to public and private networks, and attendant consoles). Each non-digital port is coupled to its port interface via a CODEC.

Matrix 85 provides TSI switching of digital information between the ports associated with expander 75, or between a port and an ISL facility to provide interconnection to a CSU. A redundant Matrix 85' is provided in ready condition to minimize the possibility of an interruption in the switching function performed by communication network 17. As described in detail below, Matrix 85 incorporates extensive self-diagnostic functions to continually monitor, in conjunction with a diagnostic/maintenance processor in controller network 16, Matrix performance. If a malfunction is detected, the diagnostic/maintenance processor automatically disconnects the faulty Matrix, and transmits a request for maintenance.

B. Controller Network Including MMI Processor

The controller network 16 includes a system processor 25, a random access memory 30, a diagnostic/maintenance management interface (MMI) processor 35, and a bus controller 40 that controls the exchange of data, address and control signals between these components over a bi-directional controller bus 50. System processor 25 performs the call sensing and processing functions that are necessary to provide interconnection and transfer of voice/data information, including controlling the TSI function preformed by Matrix 85. Bus controller 40 provides the timing, arbitration and control logic necessary for operation of the controller bus 50. Request for bus access by system processor 25 and MMI processor 35 are solicited, arbitrated and granted by this device on a first-come, first-served basis.

MMI processor 35 is dedicated to providing diagnostic and maintenance control procedures, including system initialization/configuration and system reconfiguration as malfunctions in the various components of the communications and controller networks—such as Matrix 85—are detected. Thus, while the following discussion is with reference the use of MMI processor 35 to monitor the diagnostic functions incorporated in Matrix 85 (and redundant Matrix 85'), the MMI processor also monitors the other components of the controller and communication networks in accordance with dedicated subroutines.

MMI processor 35 continuously controls and monitors the diagnostic functions of Matrix 85 pursuant to a standard diagnostic program. The diagnostic program causes diagnostic instructions and status requests to be forwarded to Matrix 85, and receives status responses. MMI processor 35 identifies Matrix 85 (and the other components of the communications network) by means of physical addresses. The physical address for Matrix 85 is provided by a group of seven edge pin connections between the matrix board and its slot in a card cage. Some of the edge pin connectors are grounded in a pattern unique to that card cage location, providing a unique 6 bit physical address, and a parity bit, that can be used by MMI processor 35 and Matrix 85 to confirm proper addressing.

Figure 2:
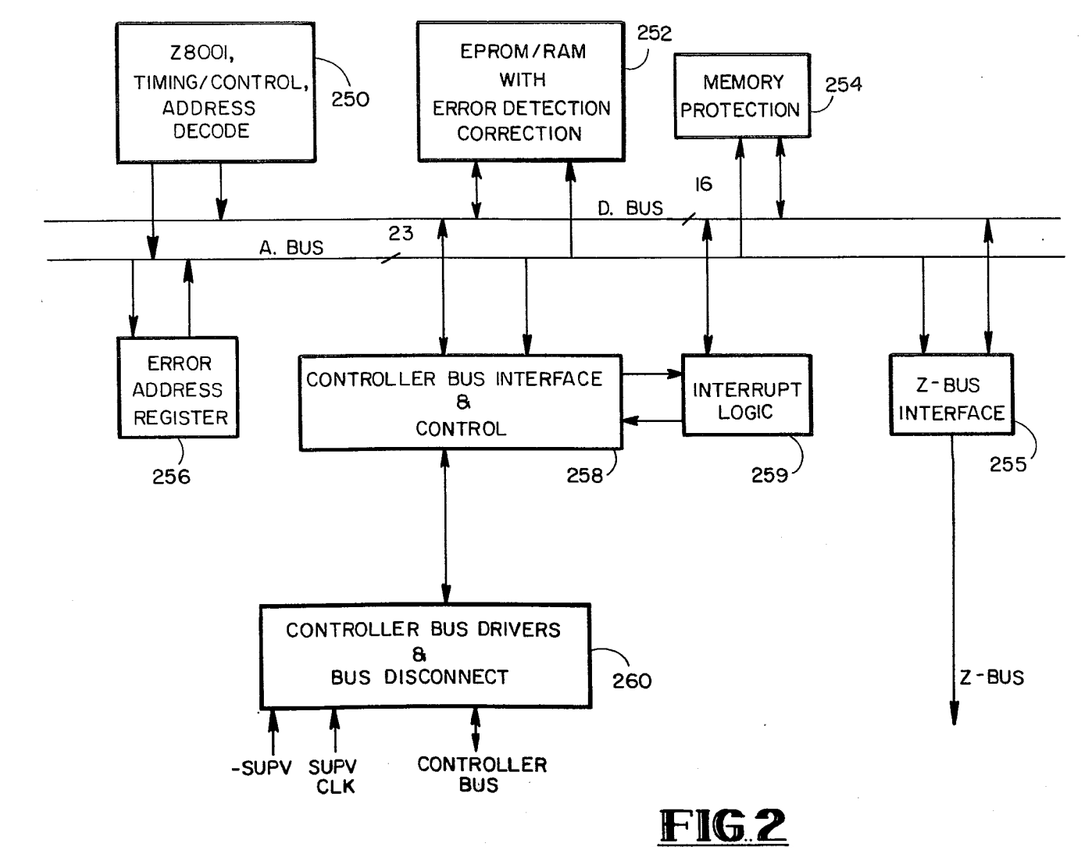
FIG. 2 is a schematic diagram of an exemplary system/MMI processor architecture.

While the precise configuration and operation of the MMI processor is not critical to the present invention, an exemplary processor configuration is shown in FIG. 2. (The architecture for the system processor and bus controller is identical, the only distinction being program control.) Briefly, a microprocessor 250 includes a Zilog Z8001 single chip 16 bit microcomputer and a crystal oscillator to establish the desired clock rate. Microprocessor 250 connects to the other elements of the MMI processor via bi-directional internal address and data buses A and B. A local memory 252 includes both EPROM and dynamic RAM storage (preferably with single or double bit error detection and single bit error correction logic). A memory protection circuit 254 serves to protect the more common data stored in various areas of local memory 252 from unauthorized use. A controller bus interface and control circuit 258 provides the various registers and control logic for sending or receiving data to and from the various components addressed by MMI processor 35 via controller bus 50. In combination with the interrupt logic 259, controller bus interface and control circuit 258 is also responsible for generation and receipt of interprocessor interrupts. All data transfers to and from the MMI processor are on a memory-mapped I/O basis.

C. Terminal Bus Interface Network

Referring again to FIG. 1, diagnostic instructions and status requests are exchanged between Matrix 85 and MMI processor 35 via terminal bus interface network 18, which includes a terminal bus interface circuit 45 and a terminal bus 65.

Terminal bus interface circuit 45 performs the data and address conversions required between MMI processor 35 and Matrix 85 (i.e., between controller bus 50 and terminal bus 65), forming a uniform data, control and status link between these devices. The conversion function of the terminal bus interface circuit is implemented using decoders and registers to translate word data from the controller bus into corresponding byte-multiplex word data on the terminal bus. Odd parity is provided by the terminal bus interface circuit for each transmitted byte of the byte-multiplex data. In addition, timing and synchronization signals required for operation of Matrix 85 in synchronism with the PCM buses are generated on lines PCMCLK, 2XPCMCLK, and PCMFSYNC.

Terminal bus 65 includes a line TCLK providing a clock signal from the terminal bus interface circuit that synchronizes all data transfers and timing on the terminal bus. (This clock signal is independent of the PCMCLK signal that synchronizes operations on the PCM buses.) Data transfers occur on terminal bus 65 in successive terminal bus cycles, each comprising function, address and data cycles. A line TSTB carries a synchronizing pulse (strobe) generated by the terminal bus interface circuit to establish the beginning of a terminal bus cycle. The nine TAD lines (8 data bits plus parity) of the terminal bus 65 provide a bi-directional bus on which function (write/read), address and data information used to control and monitor the diagnostic functions of Matrix 85 are exchanged. The line TERR is an error line which is activated by Matrix 85 when a parity error is detected. The TRDY line is activated by Matrix 85 to indicate that it has received a diagnostic instruction (write operation) or is presenting a requested status response (read operation). T-bus interface 45 performs a time-out on each terminal bus operation to provide for completion of the operation.

II. SWITCHING FUNCTION AND CIRCUIT DESCRIPTION

As previously indicated, Matrix 85 performs the TSI switching function for the RSU shown in FIG. 1, interconnecting the ports associated with expander(s) 75 both to each other and to ISL interface 70 for communication with a CSU.

A. Switching Function

According to well known TSI techniques, Matrix 85 operates on a PCM data stream comprising voice samples or data bytes formatted in frames of a predetermined number of time slots, with each time slot being assigned to a respective port associated with expander(s) 75 or a transmission link associated with ISL interface 70. In each frame, expander(s) 75 and ISL interface 70 transmit bit-parallel/byte-serial PCM data in their assigned time slots over XMTPCM bus 66 to Matrix 85 while the Matrix returns time slot interchanged PCM data in corresponding time slots over RCVPCM bus 67. That is, the switching function embodied in Matrix 85 consists of establishing a path in time between time slots in incoming and outgoing time slot multiplex frames.

While the switching capacity of Matrix 85 is a matter for design, for a preferred embodiment the Matrix comprises a 512×512 non-blocking solid state switch. The PCM frame format comprises 512 time slots, of which 128 time slots are assigned to ISL interface 70 and the remaining 384 time slots are available for the ports associated with expander(s) 75. To accomodate the full complement of 384 ports, the preferred RSU configuration includes three expanders each serving 128 ports.

Each port (or ISL) requires a full duplex 64K byte per second connection to handle the standard 8,000 digitized voice samples (voice port) or data bytes (data port) per second. Thus, Matrix 85 must perform TSI switching for 8,000 frames per second (i.e. 8,000 voice samples or data bytes a second for each of the 512 time slots assigned to ports or ISLs) from XMTPCM bus 66 to RCVPCM bus 67 (a total of 4.096 M samples or bytes per second).

The preferred embodiment accomplishes time slot/frame formatting, timing and synchronization as follows. A frame is divided into 512 time slots designated 0–511. During each frame, expanders 75 (designated 0, 1 and 2) place parallel format PCM data (voice samples or data bytes) on XMTPCM bus 66 and receive PCM data from RCVPCM bus 67 (full duplex) as follows: (a) expander 0 is assigned time slots 0, 4, 8, 12 . . . 508, (b) expander 1 is assigned time slots 1, 5, 9, 13 . . . 509, (c) expander 2 is assigned time slots 2, 6, 10, 14 . . . 510. Similarly, ISL interface 70 is assigned time slots 3, 7, 11, 15 . . . 511 (The 128 time slots assigned to the ISL interface are divided between two ISL's with 64 time slots each).

Figure 3:
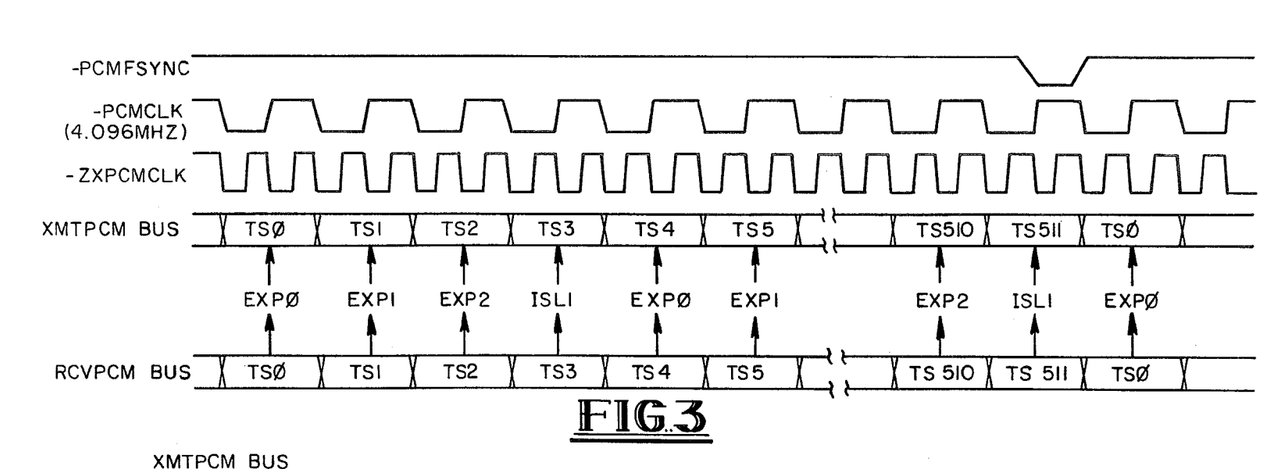
FIG. 3 is a timing diagram showing the relationship between the time slots on the XMT/RCVPCM buses and the timing signals that control the time slot interchange switching function of the switch matrix.

As indicated in FIG. 3, the above time slot multiplex format runs continuously, in synchronism with a timing signal PCMCLK and a synchronization signal PCMFSYNC. The time slot during which PCMFSYNC occurs (once per frame) defines time slot 511. In this manner, the 512 time slots in each frame transmitted over XMT/RCVPCM buses 66/67 provide synchronous time-domain locations for data from and to the 128 ports associated with each expander and the 128 transmission links provided by the ISL interface.

Figure 4:
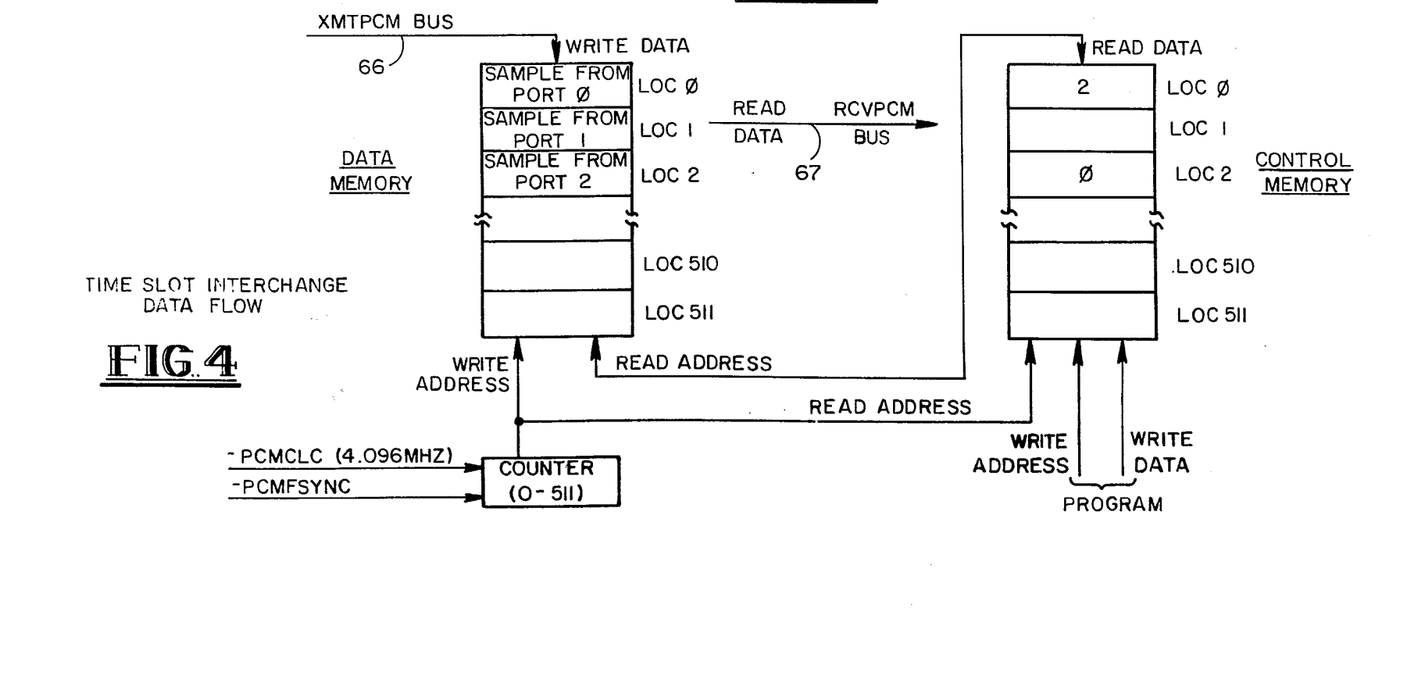
FIG. 4 is a schematic diagram illustrating the time slot interchange switching function.

Matrix 85 provides for the movement (interchange) of data appearing in one time slot on XMTPCM bus 66 to another time slot (corresponding to a different physical port or link) on RCVPCM bus 67. Matrix 85 accomplishes the TSI function using a data memory with 512 separate storage locations for the time slots in each frame, and a control memory having a corresponding number of read address locations. As illustrated in FIG. 4, data from XMTPCM bus 66 is continuously written into sequential locations of the 512 location data memory. That is, the data from time slot 0 is written to location 0, the data from time slot 1 is written to location 1, etc., so that the contents of the data memory are completely updated each frame (8,000 times per second). The write addresses for the data memory are provided by a time slot counter synchronized to the timing on the PCM buses.

To achieve the TSI function, data is read from the data memory location and placed on RCVPCM bus 67 nonsequentially. That is, instead of using the address counter for read addresses (which would result in a "loopback" function), read addresses are taken each time slot from control memory locations which contain the data memory read address for the data memory location from which data for that output time slot corresponding to that control memory location is to be read and placed on RCVPCM bus 67. These read addresses are loaded under program control into the corresponding control memory locations.

For example, assume a connection is desired between port 0 (time slot 0 from expander 0) and port 256 (time slot 2 from expander 2). FIG. 4 shows that the PCM data for time slots 0 and 2 always reside in respective data memory locations 0 and 2 by virtue of the fixed, sequential write operation from XMTPCM bus 66 to the data memory. Control memory locations 0 and 2 have been previously loaded with the respective read addresses for data memory locations 2 and 0. During time slot 0 control memory location 0 is accessed to provide read address 2, causing the PCM data (frame delayed) in data memory location 2 to be read out and placed on RCVPCM bus 67 in time slot 0. Similarly, during time slot 2, control memory location 2 is accessed to provide the data memory read address 0 causing the PCM data in data memory location 0 to be read out and placed upon RCVPCM bus 67 in time slot 2.

B. Circuit Description—General

Figure 5:
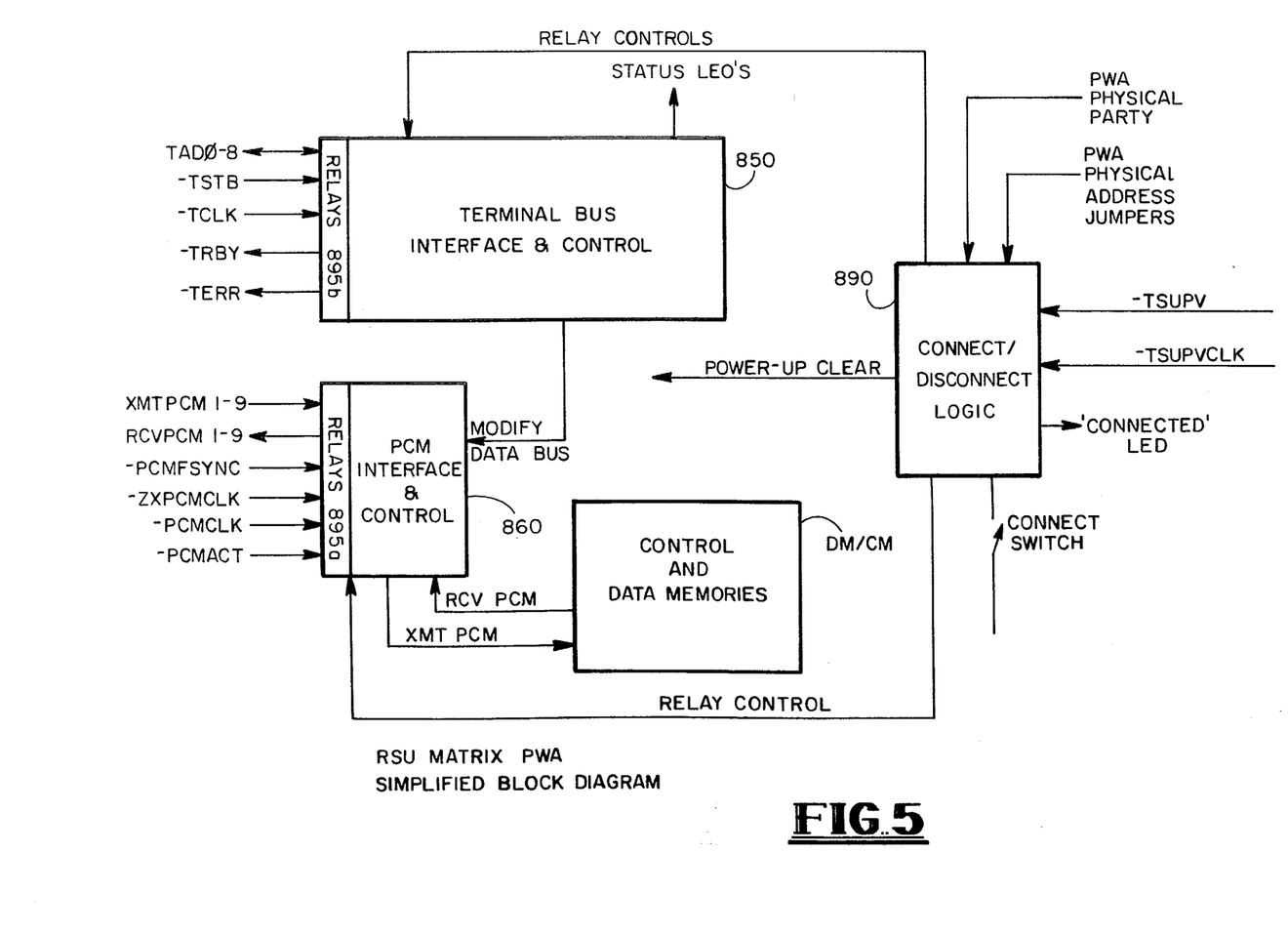
FIG. 5 is a schematic diagram showing the principal functional areas of the switch matrix of the present invention.

Referring to FIG. 5, Matrix 85 includes the following functional areas:
1. T-Bus interface and control logic 850.
2. PCM interface and control logic 860.
3. Data/control memories DM/CM.
4. Connect/disconnect logic 890 and connect/disconnect relays 895a and b.

T-bus interface and control 850 provides a central control/diagnostic/monitor interface between Matrix 85 and the system/MMI processors. It includes various registers and control logic for receiving and transmitting via the terminal bus and terminal bus interface circuit (a) control/address data from the system processor to implement the TSI function, and (b) diagnostic instructions and status responses from and to the MMI processor, in synchronism with clock signals provided over the terminal bus. Control/address/diagnostic instructions are transferred from the T-bus interface and control logic to the specified destination in the other areas of the Matrix via a modify data bus. T-bus interface and control 850 also provides parity checking for all data/instructions exchanged over the terminal bus.

PCM interface and control 860 provides logic for implementing the Matrix diagnostic functions (inject and monitor and parity checking). It receives parallel format PCM data from XMTPCM bus 66 (8 data bits plus parity), and transmits PCM (interchange) data over RCVPCM bus 67. PCM interface and control 860 receives timing and synchronization signals from the terminal bus interface circuit to synchronize its operation with the PCM buses.

Data/control memories DM/CM implement the TSI switching function for the Matrix. Control addresses are provided to the control memory from the system/MMI processors. The control memory also receives from the MMI processor control instructions for tri-stating the output drivers for one or the other redundant matrices. Preferably, the data memory is a 512 location by 9 bit (8 data bits plus parity) static RAM, and the control memory is a 512 location by 12 bit (11 data bits plus parity) static RAM.

Connect/disconnect logic 890 controls connect relays 895a and 895b in response to connect/disconnect commands received from the MMI processor. All connections between Matrix 85 and the terminal and XMT/RCV PCM buses are made through switch contacts in the relays. This arrangement provides protection against total RSU failure due to electrical driver or receiver malfunctions in the Matrix.

To achieve the required operating speed, pipelining is employed at some points in the flow of data from the input to the output of the Matrix. For example, the preferred Matrix implementation introduces a 3-time slot delay between the time the control memory obtains a control instruction (including data memory read address and out-enable bit), and the time the corresponding data memory location is actually read from data memory DM.

C. Circuit Description—Specific

As indicated, the switching and related diagnostic functions are provided by PCM interface and control logic 860 and the control and data memories. The control/diagnostic instructions to implement these functions are provided by T-bus interface and control logic 850.

1. Switching/Diagnostic Logic

Figure 6:
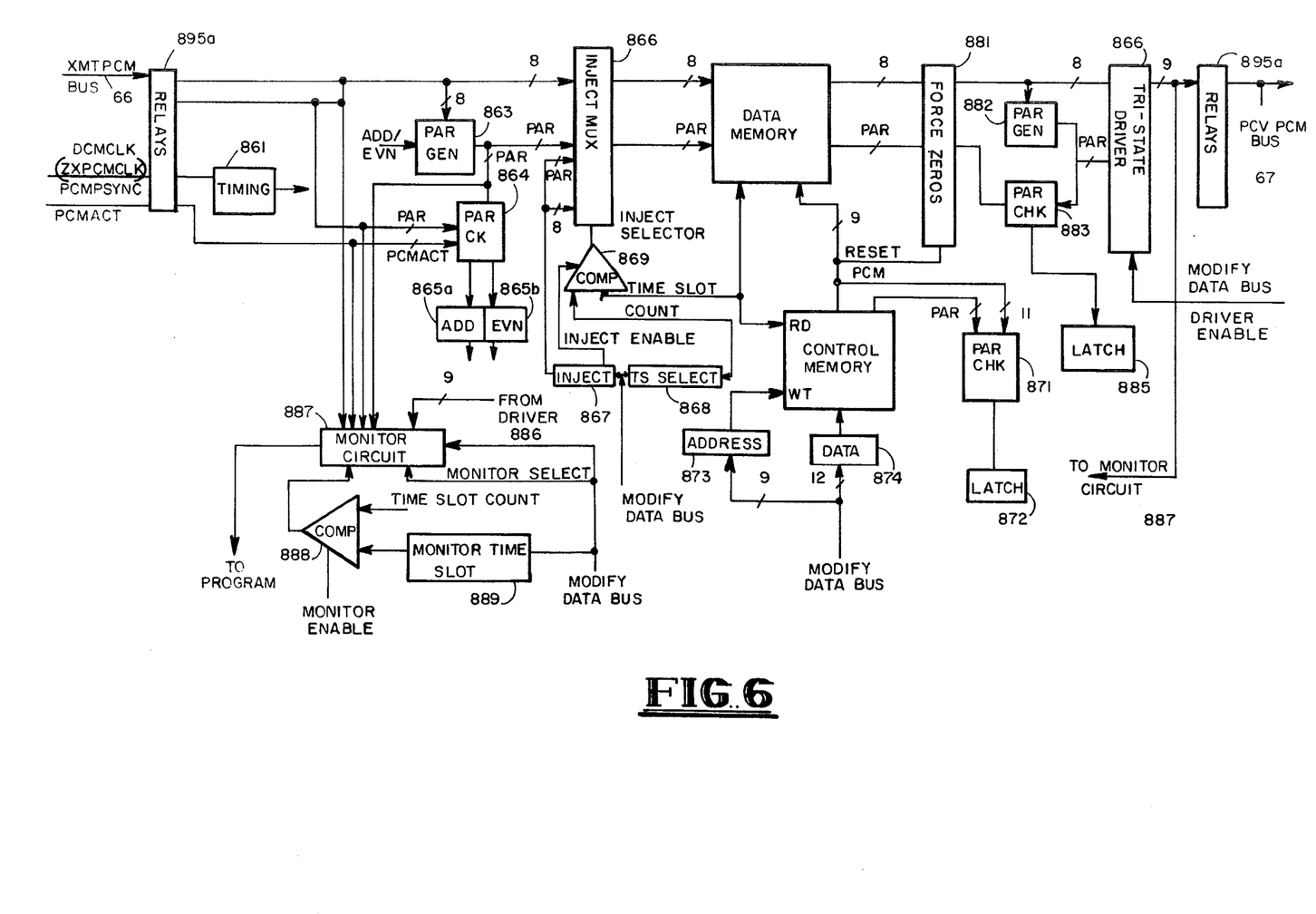
FIG. 6 is a schematic diagram and data flow pictorial for the switching and diagnostic circuitry of the switch matrix.

FIG. 6 provides a more detailed schematic and data flow pictorial for PCM interface and control 860 and the data/control memories. PCM interface and control 860 sequentially receives, through relays 895a, parallel format PCM data from the nine XMTPCM bus lines (8 data bits plus parity). In accordance with industry standard PCM specifications, bit 1 represents the sign bit of the analog-to-digital conversion performed by a ports CODEC, bit 2 represents the most significant bit of a 7-bit magnitude conversion, bit 8 represents the least signficant bit of the analog-to-digital conversion, and bit 9 is a parity bit. PCM interface and control 860 also receives the following timing/control/synchronization signals:

1. PCMCLK is a 4.096 MHz clock generated by the terminal bus interface circuit. This clock is also provided to ISL interface 70 and expanders 75 to establish timing on the XMT/RCVPCM buses. This clock is recovered from ISL data received from a CSU by ISL interface 70. (In the CSU configuration, this clock is generated by a master oscillator in the terminal bus interface circuit.)
2. 2XPCMCLK is an 8.192 MHZ clock generated by the terminal bus interface circuit which is used to control time-interleaved write/read address operations for the data and control memories.
3. PCMFSYNC is generated by the terminal bus interface circuit to provide time slot synchronization between Matrix 85 and ISL interface 70 and expanders 75. As shown in FIG. 3, PCMFSYNC is active (low) only during the second half of the byte time designated time slot 511.
4. PCMACT is a line activated by a respective ISL interface or expander during those time slots that it is designated to apply PCM data to XMTPCM bus 66. Activation indicates presence of the respective ISL interface or expander, and enables input parity detection circuitry in the PCM interface and control logic, (i.e., the PCMACT line is inactive during those time slots assigned to an expander or ISL interface which is not present in the particular RSU configuration).

The PCM timing signals other than PCMACT are provided to a timing circuit 861 comprising a timing decoder and a time slot counter. The timing decoder decodes the PCM timing signals to provide corresponding Matrix timing signals that synchronize the operation of the PCM interface and control circuitry, and the data and control memories, to the PCM buses. The time slot counter is responsive to the PCMCLK and the PCMFSYNC signals to provide an internal time slot count synchronized to the PCM data. These timing and time slot count signals are provided to the various components of the PCM interface and control logic and the data and control memories; to reduce complexity the associated timing/time slot count connections are not shown in FIG. 6.

After passing through input relays 895a, the PCM data (8 data bits plus odd parity) in each time slot is applied to an input parity circuit comprising parity generator 863 and parity checker 864. The 8 data bits are applied to parity generator 863, while the odd parity bit is applied to parity checker 864 which is enabled by the PCMACT control signal. Parity generator 863 selectively generates an odd or even parity bit corresponding to the input PCM data and app.lies this generated parity bit to parity checker 864, which compares it with the odd parity bit transmitted with the PCM data and provides separate odd/even parity error indications.

The input parity circuit is operable in either an odd (normal) or even parity mode, enabling verification of the check circuitry. Parity generator 863 is responsive to a diagnostic instruction from the diagnostic program to generate either odd or even parity. Parity error latch 865a latches even parity errors while parity error latch 865b latches odd parity errors. In normal operation, with parity generator 863 set for odd parity, and with no errors occurring on XMTPCM bus 66, odd parity error latch 865a is not set but the even parity error latch 865b is set since continuous even parity errors are occurring. However, if a single bit error occurs in the input PCM data byte, a parity error will be detected and the odd parity error latch set. The contents of these latches are read pursuant to diagnostic instructions. Once set, either latch remains set until reset by the diagnostic program.

After input parity checking, the PCM data byte and the regenerated parity bit are applied to an inject multiplexer 866. Inject multiplexer 866 is also coupled to receive programmable inject data (8 data bits plus parity) from an inject register 867. The output of inject multiplexer 866 is applied to data memory DM.

Inject data capability is provided to permit programmable data to be substituted in any time slot for the input PCM data from the XMTPCM bus. Inject register 867 receives the programmable inject data together with an inject enable bit, while an inject time slot register 868 receives the corresponding inject time slot number, both loaded under diagnostic program control via the modify data bus. Inject register 867 presents the inject data to one set of inputs to inject multiplexer 866.

Inject multiplexer 866 outputs in each time slot either the input PCM data or the presented inject data, depending upon the state of an inject selector signal from a comparator 869. Comparator 869 compares the programmable inject time slot number stored in inject time slot register 868 with the time slot count from timing circuit 861, and when enabled by the inject enable bit from inject register 867, provides an inject select/active signal for the designated inject time slot of each successive frame. Thus, inject multiplexer 866 outputs the presented inject data, in place of the input PCM data, in each designated time slots of successive frames. Typically, inject data is inserted only in unused time slots.

Data memory DM and control memory CM function as described above with respect to FIG. 4, providing TSI switching of the PCM or inject data received from inject multiplexer 866. This data is written into data memory DM in synchronism with the time slot count from timing circuit 861, and stored in a memory location corresponding to the time slot of the received data. Time-interleaved with the sequential write operations, control memory CM provides 9 bit read addresses to non-sequential locations of data memory DM in synchronism with the time slot count causing the PCM/inject data in the addressed location of the data memory to be read.

In addition to a 9 bit read address, control memory CM outputs each time slot: two enable bits and a parity bit. The 12 bit control memory output is applied to a parity checker 871. If a parity error is detected, a parity latch 872 is set. This latch is read and reset pursuant to diagnostic instructions from the diagnostic program.

For each control memory location (i.e., for each time slot), control memory CM receives a 12-bit instruction (9 read address bits and two enable bits plus parity) and the corresponding control memory address via the modify data bus. These control memory instructions/addresses are provided by the system/MMI processors through T-bus interface and control logic 950; they are provided only when the data in the control memory must be updated. For each instruction, a preceding control memory write address is applied to a control memory address register 874 for execution in the next available control memory write phase (time interleaved with control memory read operations). The associated control memory instruction is provided to a control memory data register 875 in preparation for this write operation.

System processor 25 provides the data memory read addresses (and corresponding control memory addresses) that control the TSI function for those time slots containing PCM data, while MMI processor 35 provides data memory read addresses for those time slots containing inject data. The MMI.processor also provides the two enable bits for each time slot.

The time slot interchanged PCM/inject data read out of data memory DM is applied to a force zeros network 881. The force zeros circuit is responsive to a reset-PCM enable bit from control memory CM to cause data read from the data memory to be replaced with 8 zeros (plus parity), resulting in the receiving port's CODEC producing no audio output (used for testing purposes).

The PCM/inject data from force zeros network 881 is applied to a data memory parity circuit, with the 8 data bits being applied to a parity generator 882 and the parity bit being applied to a parity checker 883. The parity bit is also applied to a latch 884. Parity checker 883 compares the generated odd parity bit from parity generator 882 with the parity bit read out of data memory DM, and, if a parity error is detected, sets a parity error latch 885. Latch 885 is read pursuant to a diagnostic instruction from the diagnostic program. Check circuitry verification can be provided by injecting data (through inject multiplexer 866) with even parity, thereby forcing odd parity errors.

The PCM/inject data byte and the generated parity bit are applied to a tri-state output driver 886. In each time slot, tri-state driver 886 is responsive to an out-enable command from control memory CM to drive the lines of RCVPCM bus 67 to provide the PCM output from the Matrix. The use of a tri-state driver enables both Matrix 85 and redundant Matrix 85' to be electrically connected to RCVPCM bus 67. The tri-state driver can be disabled in all time slots by a programmable driver enable signal.

Tri-state driver 886 can be enabled or disabled during individual time slots in any programmable manner. Thus, Matrix 85 can be programmed to output during some time slots while spare Matrix 85' outputs during the other time slots (and in fact both could be used to perform the TSI function alone in the event that one malfunctions).

The PCM interface and control logic includes monitor circuitry comprising a monitor circuit 887, a comparator 888, and a monitor time slot register 889. Monitor circuit 887 (which can be a multiplexer and a register) includes one set of inputs coupled to receive the input PCM data byte along with the input parity bit, the generated bit (from parity generator 863) and the PCMACT bit. The other set of monitor circuit inputs are coupled to receive the output PCM/inject data (8 data bits plus parity) from driver 886. Monitor time slot register 889 receives a programmable monitor time slot number loaded under diagnostic program control via the modify data bus.

Monitor circuit 887 is responsive to a programmable monitor select command to capture, in the designated monitor time slot stored in monitor time slot register 889, either the corresponding input or output data. Comparator 888 compares the monitor time slot number with the time slot count from timing circuit 861, and provides a time-slot-equal enable signal to monitor circuit 887 when the specified monitor time slot is available for monitoring. The monitored contents of monitor circuit 925 are read under diagnostic program control, enabling the MMI processor to monitor selected (known) time slots that are being used for test and diagnostic purposes.

The inject and monitor testing function provided by the PCM interface and control logic permits complete testing of the time slot interchange function for redundant matrices. The inject and monitor test mechanism permits the on-line Matrix to be tested time slot by time slot by injecting (via inject multiplexer 866) programmable inject data in a programmable (unused) time slots, and then monitoring the resulting Matrix output. In addition, because the redundant (off-line) Matrix is electrically connected to the PCM buses, it can be periodically brought on-line under program control and subject to the same inject and monitor testing. Moreover, because the output from the on-line Matrix appears at the output of the off-line Matrix, via respective disconnect relays and the PCM bus, the redundant Matrix can monitor the output of the on-line Matrix to insure that it is driving the RCVPCM bus.

The use of the unused time slots for inject and monitor testing of the on-line Matrix is expected to provide adequate testing capability to insure the reliability of the time slot interchange switching function, given typical mean component failure rates. However, full inject and monitor testing of the off-line matrix, unrelated to on-line testing in unused time slots can be provided by selectively opening the RCVPCM bus relays to electrically disconnect the Matrix from the RCVPCM bus only. In this off-line mode, the redundant Matrix could be subject to complete inject and monitor testing while off-line.

In summary, Matrix 85 provides the following diagnostic functions:

1. Input parity checking for the PCM data received from the XMTPCM bus using parity generator 863 and parity checker 864.
2. Verification of input parity circuitry using programmable odd and even parity checking modes.
3. Inject and monitor testing of the TSI function using inject multiplexer 866 to inject programmable inject data in a programmable (unused) time slot which is read out of data memory DM in any programmable time slot, allowing every possible TSI combination to be monitored.
4. Control memory parity checking for the address/control output from control memory CM.
5. Data memory parity checking for the PCM/inject data output from data memory DM.
6. Verification of data memory parity checking using injected data with even parity.
7. Programmable tri-stating of output driver 886 to allow continuous on-line monitoring of both Matrix 85 and spare Matrix 85', with only one Matrix actually transmitting PCM data in any given time slot to RCVPCM bus 67.
8. Monitoring of output from on-line Matrix by off-line Matrix to confirm that the on-line Matrix is driving the RCVPCM bus.

These diagnostic functions are implemented and monitored by a standard diagnostic program that, for a preferred embodiment, comprises a diagnostic subroutine in MMI processor 35 of the RSU. Diagnostic instructions (including status requests) and status responses are exchanged between the Matrix and the MMI processor through T-bus interface and control 850.

2. T-Bus Interface and Control Logic

The switching and related diagnostic functions of the Matrix are adaptable to function in a digital switching system with a variety of control interface configurations. For a preferred embodiment T-bus interface and control logic 850 provides the interface for receiving TSI control instructions and receiving/transmitting diagnostic instructions/status responses between the Matrix and the system/MMI processors. These instructions/responses are received/transmitted via terminal bus interface 45 and terminal bus 65 (see FIG. 1), with data transfers being on a memory-mapped I/O basis in byte-multiplex (word) format segregated into function (write/read), address and data cycles. T-bus interface and control 850 provides a uniform control/status/data interface for executing these instructions as corresponding internal write/read operations.

Figure 7:
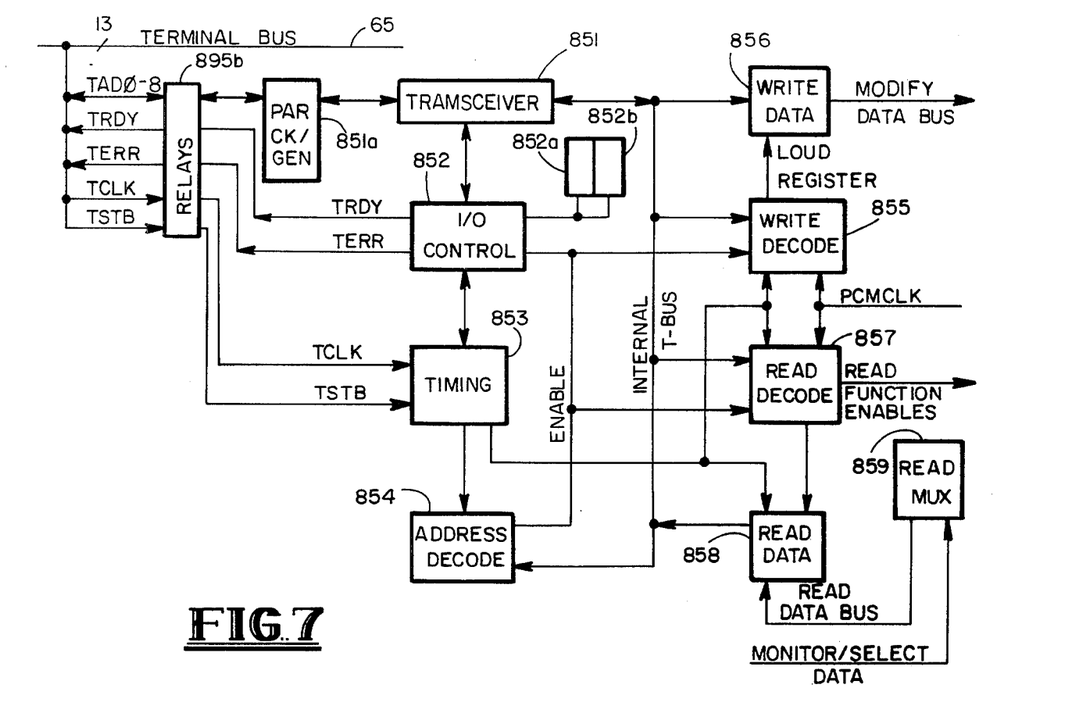
FIG. 7 is a schematic diagram of the T-bus interface and control circuitry of the switch matrix, through which data is exchanged between the switch matrix and the system/MMI processors.

Referring to FIG. 7, interface to the bi-directional TAD lines (8 data bits plus parity) of the terminal bus is through T-bus transceiver 851 which provides data transfer integrity between the TAD lines and an internal T-bus. Data transfers to and from transceiver 851 are through relays 895b and a parity check/generator circuit 851a. Parity circuit 851a checks the data presented over the terminal bus (function/address/data cycles) for odd parity errors, and provides odd parity for all read data delivered to the terminal bus pursuant to a read function.

A transceiver I/O circuit 852 provides I/O control for transceiver 851. In addition to I/O control signals, transceiver I/O circuit 852 provides a TRDY signal to terminal bus interface 45 simultaneous with the data (byte-multiplex) being exchanged to indicate that transceiver 851 is ready to receive the presented write data or return the requested read data. Transceiver I/O circuit 852 also parity error indications from parity circuit 851; a TERR error signal is provided in response to a parity error indication during any terminal bus cycle; parity error indications are also logged in separate T-bus parity error latches 852a and b depending upon whether the corresponding function was a read or write.

A timing decoder 853 provides a decoded timing signal that synchronizes TAD data transfers through transceiver 851, as well as the internal write/read operations of the T-bus interface and control logic. Timing decoder 853 generates these signals in response to the TCLK and TSTB signals from the terminal bus interface circuit. (TCLK synchronizes all data transfers and timing on the terminal bus (independent of the PCM clock rate on the PCM buses), while the TSTB indicates the beginning of a terminal bus operation (function/address/data cycles).

The system MMI processors access the T-bus interface and control logic of the Matrix by first initiating (through the terminal bus interface circuit) a function cycle (write/read function code together with a bit indicating a memory-mapped I/O operation), followed by an address cycle. Transceiver 851 provides the presented address data to an address decoder 854. This circuit compares the address supplied over the terminal bus by the system/MMI processor with the physical address associated with the location of the Matrix board. If the comparison confirms that the Matrix was addressed, an address-enable signal is provided to enable both transceiver I/O circuit 852 and the write/read control circuitry of the T-bus interface and control logic.

If transceiver 851 receives a valid write instruction (function/address/data), the presented write function portion of the instruction is transferred via the internal T-bus to a write decoder 855 which loads the presented write data into a 16 bit write data register 856 synchronous with the timing signal from timing decoder 853. The write decoder is responsive to the presented write function and the PCMCLK signal that synchronizes the Matrix switching function to provide a corresponding write function enable signal which executes the specified write operation by which the loaded write data is transferred from write data register 856 over the modify data bus to the designated location (such as the various destination registers and latches in the PCM interface and control logic).

If a valid read instruction (function/address), is presented to transceiver 851, the presented read function portion of the instruction is transferred via the internal T-bus to a read decoder 980. Read decoder 982 is responsive to the presented read function and the PCMCLK signal to provide a load register signal to a 16 bit read data register 858 and a corresponding read function enable signal to a read data multiplexer 859.

Read data multiplexer 987 continuously receives all diagnostic status/monitor data from the PCM interface and control logic (such as monitor data from the monitor control circuit and parity error indications). This multiplexing function can be dispersed (for example, to reduce signal paths) by locating separate multiplexers adjacent to the circuitry providing corresponding read data (such as the input/output monitor circuit or the various parity error latches). Each dispersed read multiplexer would be separately enabled by a corresponding read function enable signal from read decoder 857.

The read data multiplexer(s) responds to the read function enable signal (unique for each read function) to provide the requested data over a read data bus for loading into read data register 858. Synchronous with the internal timing signal from timing decoder 853, read data register 858 then transfers its contents to transceiver 851 for transmission over the terminal bus in the terminal bus data cycle associated with the executed read function. In that regard, a delay of two TCLK cycles may occur before a presented read function is executed by loading the requested read data from the read data multiplexer(s) into read data register 858 for transfer to transceiver 851; transceiver I/O circuit 852 provides the TRDY signal to the terminal bus interface circuit only when the requested read data is ready for transfer via the transceiver.

3. Diagnostic Program

As previously discussed, the Matrix diagnostic functions are implemented under program control by the MMI processor, which presents diagnostic and status instructions (write operations) and status requests that elicit status responses (read operations). The actual implementation of a suitable diagnostic program model forms no part of the present invention; standard programming techniques can be used to provide an appropriate instruction set for implementing the diagnostic instructions and status requests. The following functional instructions illustrate the interaction between the Matrix and the MMI processor in implementing the Matrix diagnostic functions.

Load Diagnostic Word. This general diagnostic instruction includes a bit that controls a red alarm LED (i.e., a "0" turns on the LED to signify a malfunction while a "1" turns the LED off), a bit that controls a yellow in-test LED and a bit that controls an in-use LED. In addition, a 4th bit designates a "loopback" condition, used for T-bus address uniqueness testing. A 5th bit controls the odd/even input parity checking modes, with a "1" causing parity generator 863 to generate even parity, and a "0" causing the generation of odd parity (normal operation). Finally, a 6th bit is a driver enable bit that can be used to disable the output tri-state drivers during all time slots; otherwise the tri-state drivers are enabled or disabled for individual time slots by the programmable out enable bit from the control memory.

Load Inject Time Slot Register. This instruction loads an inject time slot number into inject time slot register 868 such that, if the inject and monitor test is enabled, the inject data loaded into inject register 867 (next instruction) is presented to inject multiplexer 866 in place of the input PCM data. A delay of up to one frame may elapse before test injection begins, depending on the relationship between the specified time slot and the point in the frame during which this instruction is given.

Load Inject Data. This instruction loads into inject register 867 an 8-bit inject data byte along with a parity bit and an inject enable bit. In response to the inject enable bit, the loaded inject data is injected via inject multiplexer 866 in every frame during the time slot designated by the previous instruction. A delay of up to one frame may elapse before newly-specified inject data is injected, depending on the timing of this instruction with respect to the PCM frame timing.

Load Monitor Time Slot Register. This instruction specifies the input or output time slot to be monitored, which is stored in monitor tie slot register 889. It includes an input/output monitor select bit in which a "1" causes output PCM/inject data in the specified time slot to be captured by monitor circuit 887 while a "0" causes input PCM data to be captured (along with generated parity and PCMACT). The data loaded into the monitor circuit in response to this instruction is read for monitoring pursuant to the next instruction. Up to one 1 frame may elapse before data in a newly-specified time slot is actually captured.

Read Monitored PCM Data. This instruction causes the contents of input/output monitor circuit 887 to be transmitted from the Matrix to the MMI processor. The contents of this register depend upon the input/output monitor selector bit of the previous instruction. If input monitoring was previously specified, the status response to this read instruction would contain the monitored input data PCM byte for the time slot specified, together with the parity bit captured simultaneously with the input PCM data, the generated parity bit, and a bit representing the state of the PCMACTIVE line during the monitored time slot. If, on the other hand, output monitoring is specified, the monitor circuit would contain the output PCM/inject data byte from data memory DM, the parity bit for the output data, and the generated parity bit. Up to one frame may elapse after specifying a new monitor time slot or changing the input/output monitor mode before valid data appears in the status reponse to this instruction.

Load Control Memory Address Register. This instruction contains the control memory address to be loaded into control memory address register 873. The next instruction causes the corresponding data memory address to be loaded into the control memory.

Load Control Memory Data. This instruction loads the data memory location corresponding to the control memory address of the previous instruction into control memory data register 874. In addition, this instruction includes the out-enable bit that enables (or disables) output tri-state drivers 886, a reset-PCM bit that enables (or disables) force zeros circuit 881, and a program-loaded parity bit.

Read Error Status. This instruction elicits a status response providing an indication of the status of the various parity error latches in Matrix 85. The parity latches are set to "0" by a reset instruction and then, upon detection of an error, are set to "1". The 6-bit status response includes one bit each assigned to indicate the status of (a) the input (write operation) parity error latch in T-bus interface and control 850, (b) the output (read operation) parity error latch in the T-bus interface and control, (c) input PCM parity error latch (odd) 865a, (d) input PCM parity error latch (even) 865b, (e) control memory parity error latch 871, and (f) data memory parity error latch 885. As indicated previously, one of the input parity error latches (odd/even) 865a/865b will show continuous parity errors depending upon whether parity generator 863 has been set to generate even or odd parity. That is, for normal operation (i.e., parity generator 863 set for odd parity generation), the bit associated with input parity error latch (even) 865b will indicate a parity error after each reset operation.

D. Connect/disconnect network

The status responses provided by Matrix 85 to diagnostic instructions from the MMI processor provide an indication of any malfunction discovered in the course of implementing corresponding diagnostic functions. When a malfunction is detected, the diagnostic program in the MMI processor automatically initiates a procedure to electrically disconnect the faulty Matrix. Because Matrix 85 and redundant Matrix 85' are both electrically connected and capable of operating on-line, disconnection of the faulty Matrix does not affect or interrupt the critical switching function which is the performed solely by the operational Matrix.

Referring to FIGS. 1 and 5, disconnection of a faulty Matrix is accomplished by connect/disconnect logic 890 in conjunction with relays 895a and 895b. Relay 895a comprises a plurality of switches connecting the PCM lines of the XMT/RCVPCM buses and the PCM timing and synchronization lines from the terminal bus interface circit to PCM interface and control 860, while relay 895b comprises a plurality of switches coupling the teminal bus lines to T-bus interface and control 850. When a malfunction is detected by the diagnostic program, MMI processor 35 forwards a disconnect command to connect/disconnect logic 890, which opens relays 895a and 895b to effect electrical disconnection.

Connect/disconnect logic 890 receives disconnect commands and synchronizing clock signals from the MMI processor via the terminal bus interface circuit on two serial data lines—SUPV and SUPVCLK—that are separate from the terminal bus. The SUPV line carries the Matrix address and the disconnect commands, while the SUPVCLK line carries the clock signal that synchronizes connect/disconnect logic 890.

Figure 8:
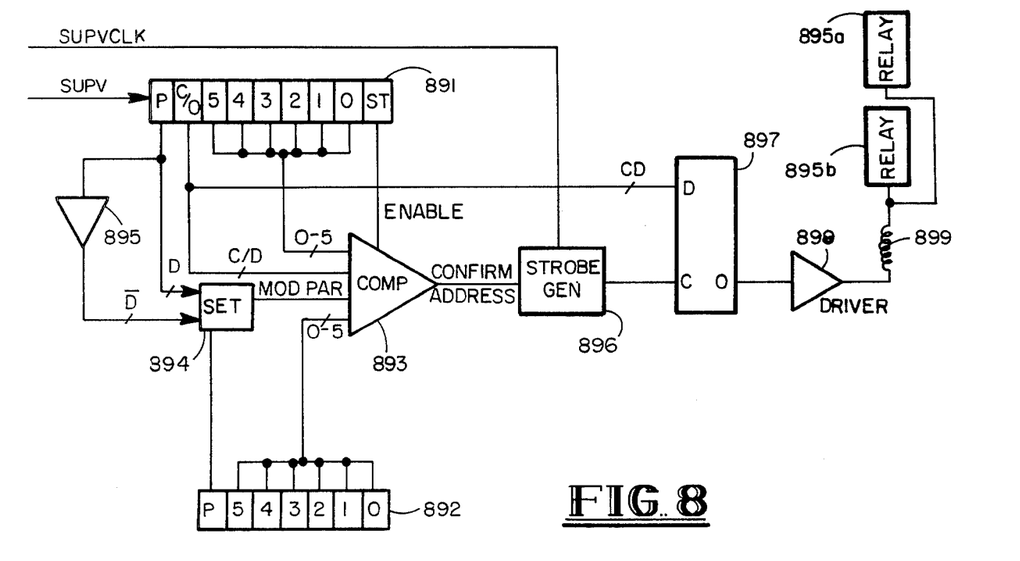
FIG. 8 is a schematic diagram of the connect/disconnect logic of the switch matrix.

Referring to FIG. 8, connect/disconnect logic 890 includes a register 891 that receives, in synchronism with the SUPVCLK signal, a connect/disconnect instruction on line SUPV. The connect/disconnect instruction comprises a start bit, a 6 bit address corresponding to the Matrix physical address, a connect/disconnect (C/D) bit, and a parity bit. The transmitted matrix address (0-5) should correspond to the physical address provided by the edge connectors for the Matrix board. This physical address (including parity) is represented by a register 892. Because the start bit is always set (1), the following relationship exists between (a) the connector edge parity and (b) the transmitted parity and C/D bits in register 891: if the connector edge parity is set, the transmitted parity will be the same as the C/D bit, while if the connector edge parity is not set, the transmitted parity will be opposite to the C/D bit.

In accordance with the above relationship, a comparator 892 is used to provide parity checking and address recognition. Comparator 893 receives at one set of inputs the five transmitted address bits and the C/D bit from register 891; the other set of corresponding inputs are provided by the five edge connector address bits and a modify parity bit from a selector 894. Selector 894 receives both the transmitted parity bit from register 891 and an inverted transmitted parity bit via an inverter 895. Selector 894 is responsive to the edge connector parity bit to provide the modified parity bit in accordance with the above relationship between the edge connector parity bit and the transmitted parity and C/D bits.

Comparator 893 is enabled by the start bit from register 891 to provide a confirm address output if the comparison function indicates that the Matrix was addressed. The output from comparator 893 is provided to a strobe generator 896 which is clocked by the SUPVCLK signal. Strobe generator 896 is responsive to the confirm address output from comparator 893 to provide a clock input to a flip-flop 897.

The data input to flip-flop 897 is provided by the C/D bit from register 891, such that the flip-flop output is set (open) or reset (close) depending upon the state of the C/D bit. When the clock signal from strobe generator 896 is removed at the end of the SUPV address operation, flip-flop 896 in effect latches the C/D bit until the next SUPV address operation.

The output from flip-flop 897 is applied through a relay driver 898 and relay coils 899 to relays 895a and 895b, to effect electrical connection/disconnection in accordance with the connect/disconnect instruction from the MMI processor. That is, if a malfunction causes the MMI processor to transmit a disconnect command, flip-flop 897 will open relays 895a and 895b to effect electrical disconnection; on the other hand, if a connect command is received, flip-flop 897 responds by closing the relay switches.

We claim:
1. A switching system including redundant on-line/-off-line switch matrices both electrically connected to a PCM (pulse code modulated) data bus for providing time slot interchange switching, and including a diagnostic processor executing a diagnostic program for controlling and implementing the diagonostic functions for each switch matrix, each switch matrix comprising:
    (a) switching means for performing time slot interchange switching of input PCM data;
    (b) inject and monitor means responsive to diagnostic instructions from the diagnostic processor to test the time slot interchange function of said switching means by:
        (i) injecting, in selectable unused time slots, predetermined PCM/inject data for the input PCM data in that time slot, the input PCM data in the other time slots being unaffected;
        (ii) implementing the time slot interchange process for those time slots containing PCM/inject (interchanged) data; and
        (iii) monitoring the PCM/inject (interchanged) data from said switching means so as to detect any malfunction in the time slot interchange switching function;

(c) output driver means for transmitting PCM and PCM/inject (interchanged) data from said switching means to a PCM bus, said driver means being selectively enabled or disabled in each time slot in accordance with a predetermined out-enable signal such that the switch matrix remains electrically connected to the PCM bus in all time slots but does not transmit PCM/inject (interchanged) data in those time slots in which it is disabled; and (d) out-enable control means responsive to diagnostic instructions from the diagonostic processor to provide a predetermined out-enable signal to selectively enable/disable said output driver;

(e) such that the output driver for an on-line switch matrix is selectively enabled while the output driver for an off-line switch matrix is selectively disabled for each time slot in a predetermined shared manner.

2. The switch matrix defined in claim 1 wherein said switch means comprises:

(a) a data memory for performing the time slot interchange function by reading in PCM/inject data in sequential time slots, and reading out PCM/inject (interchanged) data in corresponding time slots according to interchange address signals; and (b) a control memory for providing said interchange address signals to said data memory such that the PCM/inject (interchanged) data from said data memory exhibits a predetermined time slot sequence;

(c) said control memory being responsive to said switch control means to provide corresponding interchange read address signals for those time slots containing inject data.

3. The switch matrix defined in claim 2 further comprising:

(a) a first parity network for detecting parity errors in the input PCM data prior to its input to said inject means;

(b) a second parity network for detecting parity errors in the PCM/inject (interchanged) data from said data memory; and (c) a third parity network for detecting parity errors in the output from said control memory;

(d) each of said parity networks being responsive to a status request to provide an error indication to the diagnostic processor.

4. The switch matrix defined in claim 3 where in said first parity network is responsive to a diagnostic instruction from the diagnostic processor to selectively cause the input PCM data to violate parity, thereby forcing a parity error indication as a means of verifying parity checking.

5. The switch matrix defined in claim 4 wherein the diagnostic processor communicates with the switch matrix via a terminal bus, said switch matrix further comprising a T-Bus interface and control network through which diagnostic instructions specifying inject data and out-enable signals is provided to the switch matrix, and the monitored input/output PCM data from said monitor means and the parity error indications from said parity networks are provided to the diagnostic processor.

6. The switch matrix defined in claim 5 wherein said T-Bus interface and control network comprises a fourth parity network for detecting the parity errors in the diagnostic instructions/status requests received from the diagnostic processor.

7. The switch matrix defined in claim 6 further comprising:

(a) connect/disconnect means for electrically connecting said switch matrix to said PCM bus;

(b) said connect/disconnect means being responsive to a connect/disconnect command from the diagnostic processor to selectively disconnect said switch matrix from the PCM bus when the diagnostic processor detects a failure.

8. The switch matrix defined in claim 7 wherein said switch matrix is identified by a respective physical address comprising a combination of bits provided at the respective position on the PCM bus by conductors in said bus, said combination forming a physical address in said switch matrix as it is connected to said PCM bus, said physical address being used by the diagnostic processor to address the switch matrix.

* * * * *